(12) United States Patent
Komoriya

(10) Patent No.: US 6,422,837 B1
(45) Date of Patent: Jul. 23, 2002

(54) MAGNETIC BEARING PROTECTION DEVICE

(75) Inventor: Miyako Komoriya, Narashino (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/532,488

(22) Filed: Mar. 22, 2000

(30) Foreign Application Priority Data

Mar. 29, 1999 (JP) ............................................. 11-085370

(51) Int. Cl.$^7$ ............................................. F16C 32/04
(52) U.S. Cl. ................ 417/423.4; 417/423.12
(58) Field of Search .................. 417/423.12, 423.4, 417/12; 310/90.5

(56) References Cited

U.S. PATENT DOCUMENTS

| | | | |
|---|---|---|---|
| 4,023,920 A | | 5/1977 | Bachler et al. ............. 417/354 |
| 4,609,332 A | | 9/1986 | Miki et al. .................. 417/352 |
| 4,717,315 A | * | 1/1988 | Miki et al. .................. 417/365 |
| 5,256,952 A | * | 10/1993 | Yoneyama et al. .... 310/90.5 X |
| 5,667,363 A | | 9/1997 | Bernhardt et al. ......... 417/44.1 |
| 5,961,291 A | * | 10/1999 | Sakagami et al. ............ 417/42 |
| 6,123,522 A | * | 9/2000 | Kubo et al. ............... 417/423.4 |
| 6,147,425 A | * | 11/2000 | Ueyama et al. ............ 310/90.5 |

FOREIGN PATENT DOCUMENTS

| | | |
|---|---|---|
| EP | 0445691 | 9/1991 |
| EP | 0470637 | 2/1992 |
| EP | 1036951 | 9/2000 |
| JP | 7151146 | 6/1995 |
| JP | 07151146 A * | 6/1995 |
| JP | 10009266 | 1/1998 |
| JP | 10009266 A * | 1/1998 |

* cited by examiner

Primary Examiner—Edward K. Look
Assistant Examiner—Thomas E. Lazo
(74) Attorney, Agent, or Firm—Adams & Wilks

(57) ABSTRACT

A magnetic bearing protection device has at least one pair of electromagnets for levitating a rotor and for controlling one of a radial position and an axial position of the rotor. A current supplying device supplies a current to the electromagnets. A detecting device detects a current flowing through the electromagnets. A stopping device stops the supply of current to the electromagnets by the current supplying device when a duration of time during which the current detected by the detecting device exceeds a preselected current value is greater than a preselected duration of time.

6 Claims, 4 Drawing Sheets

MAGNETIC BEARING PROTECTION DEVICE

BACKGROUND OF THE INVENTION

1. Field of the Invention

The present invention relates to a magnetic bearing protection device and a turbomolecualr pump and, particularly, to a magnetic bearing protection device and a turbomolecular pump in which stable control can be achieved in light of excessive oscillation of a rotator and external vibrations.

2. Description of the Related Art

FIG. 3 is a structural diagram showing a conventional turbomolecular pump with a 5-axes-control type magnetic bearing. Magnetic bearings are for floating a rotor (hereinafter referred to as a rotator) by a magnetic force to hold the rotator without touching it. Begin capable of rotating a rotator at a high speed and suitable for use in an environment required to be highly clean, magnetic bearings are used in technical fields relating to manufacture of a semiconductor, for example, as bearings for holding rotor blades of turbomolecular pumps.

In a 5-axes-control type magnetic bearing, radial position controlling electromagnets 3A, 3B and an axial position controlling electromagnet 5 are used to float rotor blades 1.

For instance, the radial position of the upper rotor blades 1 is actively controlled such that a present radial position of the upper rotor blades 1 is detected by a radial position sensor 7A and, through a compensating circuit 9A having a PID adjusting function, after current is amplified by a current amplifier 11A, the radial position controlling electromagnet 3A is driven.

The radial position of the lower rotor blades 1 and the axial position of the rotor blades 1 are controlled by a similar mechanism, though not shown.

With the rotor blades 1 being accelerated by a high frequency motor 21, a temporal oscillation may take place when passing through a so-called resonance point unique to the rotor blades 1, where their unique frequency coincides with the rotation frequency. In addition, the rotor blades 1 may be shaken from an externally given shake such as an earthquake, or from a sudden gas (the atmosphere) suction for some reasons while the turbomolecular pump discharges gas from a not-shown chamber through an inlet port 19, which results in shift from vacuum to atmosphere release (hereinafter referred to as atmosphere burst-in).

How the rotor blades 1 oscillate upon this atmosphere burst-in is illustrated in FIG. 4. Shown in the figure is a record of the behavior in the axial direction of the rotor blades 1, expressed by outputs of the axial position sensor incorporated in the turbomolecular pump. The rotor blades 1 are, for an instant, depressed to the outlet port side upon the atmosphere burst-in, but are immediately pushed upward to the inlet port 19 side by an aerodynamic thrust as in a helicopter.

As shown in FIG. 4, the rotor blades 1 gradually stop oscillating in about a few seconds (6 seconds, in this case) after the atmosphere burst-in. When such oscillation takes place, the rotor blades 1 come into contact with touch down bearings 13, 15, and might bring them along and wear or damage the touch down bearings 13, 15 in some cases.

The attempt to bring the rotor blades 1 in such state back to a normal rotation position by floating it with a magnetic force causes excessive current, for the current is increased in radial position controlling electromagnets 3A, 3B and the axial position controlling electromagnet 5. Because of this excessive current, a coil for magnetic bearing is overheated. A conventional countermeasure against such overheat is to provide a magnetic bearing driver circuit with a current limiter 17 to limit the current flowing into the coil for magnetic bearing to, for example, 2 [A].

As described above, current is always limited in a conventional turbomolecular pump irrespective of operation condition of the pump. This limitation leads to a power shortage of the magnetic bearing against the above-mentioned excessive oscillation of the rotor blades 1 and externally given shake, delaying the end of oscillation of the rotor blades 1. This delay of the end increases the load put on the touch down bearings 13, 15.

SUMMARY OF THE INVENTION

The present invention has been made in view of the above problems inherent in the prior art, and an object of the present invention is therefore to provide a magnetic bearing protection device and a turbomolecular pump in which stable control can be held against the excessive oscillation of a rotator and an externally given shake.

In order to attain the object above, a magnetic bearing protection device of the present invention comprises:

a position sensor for detecting the position of a rotator;

at least a pair of controlling electromagnets capable of holding the rotator in the air and of controlling the radial position or the axial position of the rotator based on a position signal obtained from the detection made by the position sensor;

a current supplying means for supplying electric current to the controlling electromagnets;

a controlling current detecting means for detecting the current flowing into the controlling electromagnets from the current supplying means;

a current anomaly judging means for judging whether or not the current detected by the controlling current detecting means exceeds a set current value that is set in advance;

a time anomaly judging means for judging, when the current anomaly judging means judges that the flowing current exceeds the set current value, whether or not the current exceed lasts for over a set time that is set in advance; and a stopping means for stopping current supply from the current supplying means to the controlling electromagnets when the time anomaly judging means judges that the lapse of time from the start of the current exceed is longer than the set time.

The position sensor detects the position of the rotator. This position sensor can detect the radial position or the axial position of the rotator. The controlling electromagnets can hold the rotator in the air and control the radial position or the axial position of the rotator based on a position signal obtained from the detection made by the position sensor.

The controlling electromagnets, in the case of a 3-axes-control type magnetic bearing, for example, consist of a pair of radial position controlling electromagnets and a pair of axial position controlling electromagnets. In the case of a 5-axes-control type magnetic bearing, the controlling electromagnets consist of two pairs of radial position controlling electromagnets which are axially spaced apart from each other and a pair of axial position controlling electromagnets.

Alternatively, some of the radial position controlling electromagnets and of the axial position controlling electromagnets may be permanent magnets. A bearingless motor or the like may be used which produces, while adjusting magnetically the radial position, a rotational force through a magnetic force that is generated from an electromotor coil and is unbalanced by a magnetic force generated from the radial position controlling electromagnets.

The current supplying means supplies the controlling electromagnets with current. The controlling current detecting means detects the current flowing from the current supplying means to the controlling electromagnets. The current anomaly judging means judges whether or not the current detected by the controlling current detecting means exceeds a set current value that is set in advance.

The time anomaly judging means judges, when the current anomaly judging means judges that the flowing current exceeds the set current value, whether or not the current exceed lasts for over a set time that is set in advance. The stopping means stops current supply from the cur rent supplying means to the controlling electromagnets when the time anomaly judging means judges that the lapse of time from the start of the current exceed is longer than the set time.

In short, when the current flowing into the controlling electromagnets reaches a preset value for a given period of time, the magnetic bearing is stopped for the purpose of protecting the same. However, no limitation is put on the value of the current flowing into the controlling electromagnets, so that oscillation of the rotator, etc., will end early in various conceivable events.

In most cases, therefore, the situation will be recovered before the magnetic bearing has to be stopped.

Also, the early ending of the oscillation of the rotator gives less damage to the touch down bearings.

According to another measure to attain the above object, a turbomolecular pump of the present invention comprises:

rotor blades;

a rotating means for rotating the rotor blades;

a position sensor for detecting the position of the rotor blades;

at least a pair of controlling electromagnets capable of holding the rotor blades in the air and of controlling the radial position or the axial position of the rotor blades based on a position signal obtained from the detection made by the position sensor;

a current supplying means for supplying electric current to the controlling electromagnets;

a controlling current detecting means for detecting the current flowing into the controlling electromagnets from the current supplying means;

a current anomaly judging means for judging whether or not the current detected by the controlling current detecting means exceeds a set current value that is set in advance;

a time anomaly judging means for judging, when the current anomaly judging means judges that the flowing current exceeds the set current value, whether or not the current exceed lasts for over a set time that is set in advance; and a stopping means for stopping current supply from the current supplying means to the controlling electromagnets when the time anomaly judging means judges that the lapse of time from the start of the current exceed is longer than the set time.

The pump of the present invention is an application of the above magnetic bearing protective device to a turbomolecular pump.

With the structures above, stable control can be held against the excessive oscillation of the rotor blades and externally given shake.

BRIEF DESCRIPTION OF THE DRAWINGS

In the accompanying drawings:

FIG. 4 is a chart showing how rotor blades oscillate upon atmosphere burst-in.

DETAILED DESCRIPTION OF THE PREFERRED EMBODIMENT

Figure 3:
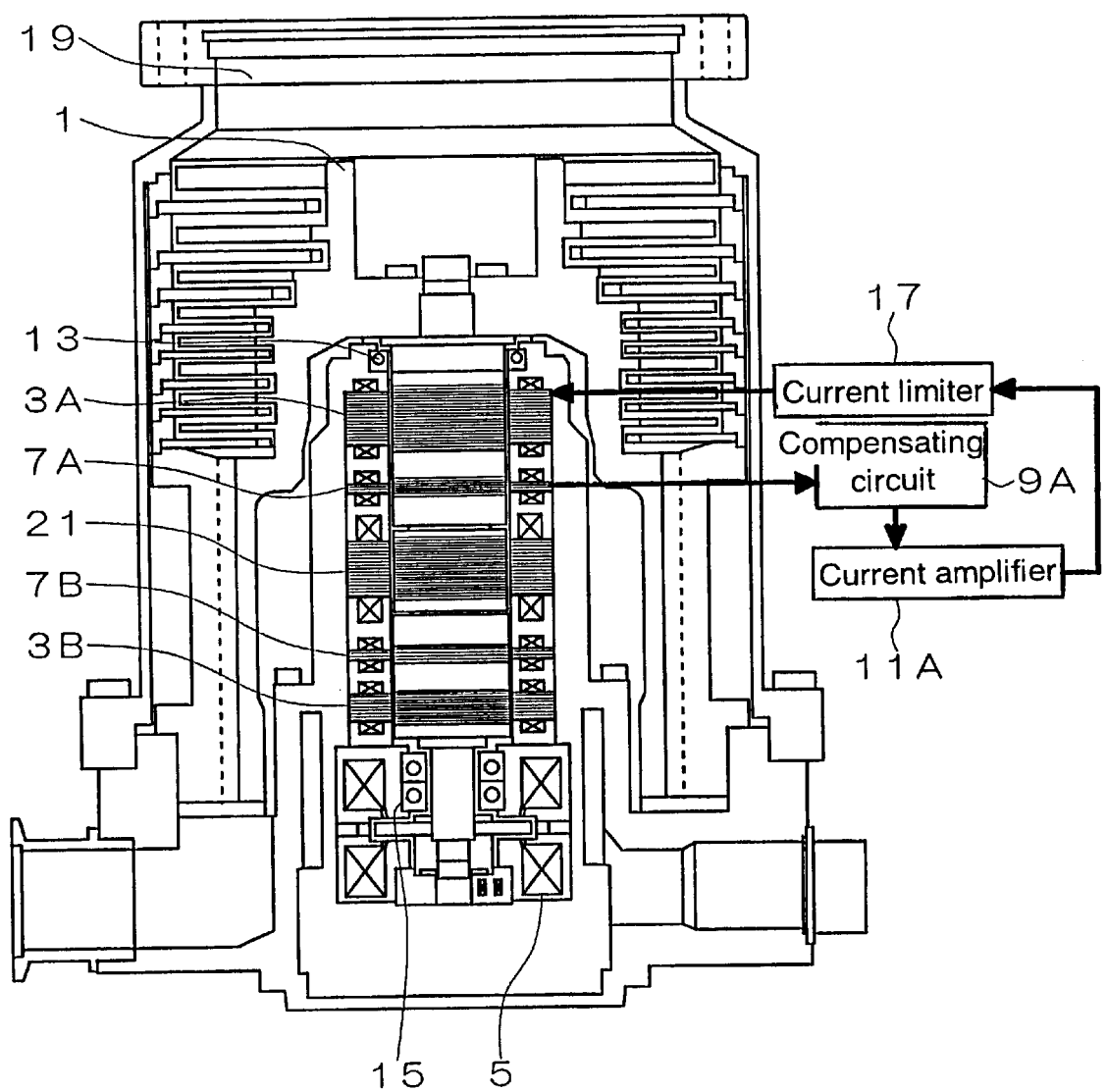
FIG. 3 is a structural diagram of a conventional turbomolecular pump having a 5-axes-control type magnetic bearing.

An embodiment of the present invention will be described below. A structural diagram of an embodiment of the present invention is found in FIG. 1. Similar components to the ones in FIG. 3 are designated by the same reference symbols and explanations thereof will be omitted.

Figure 1:
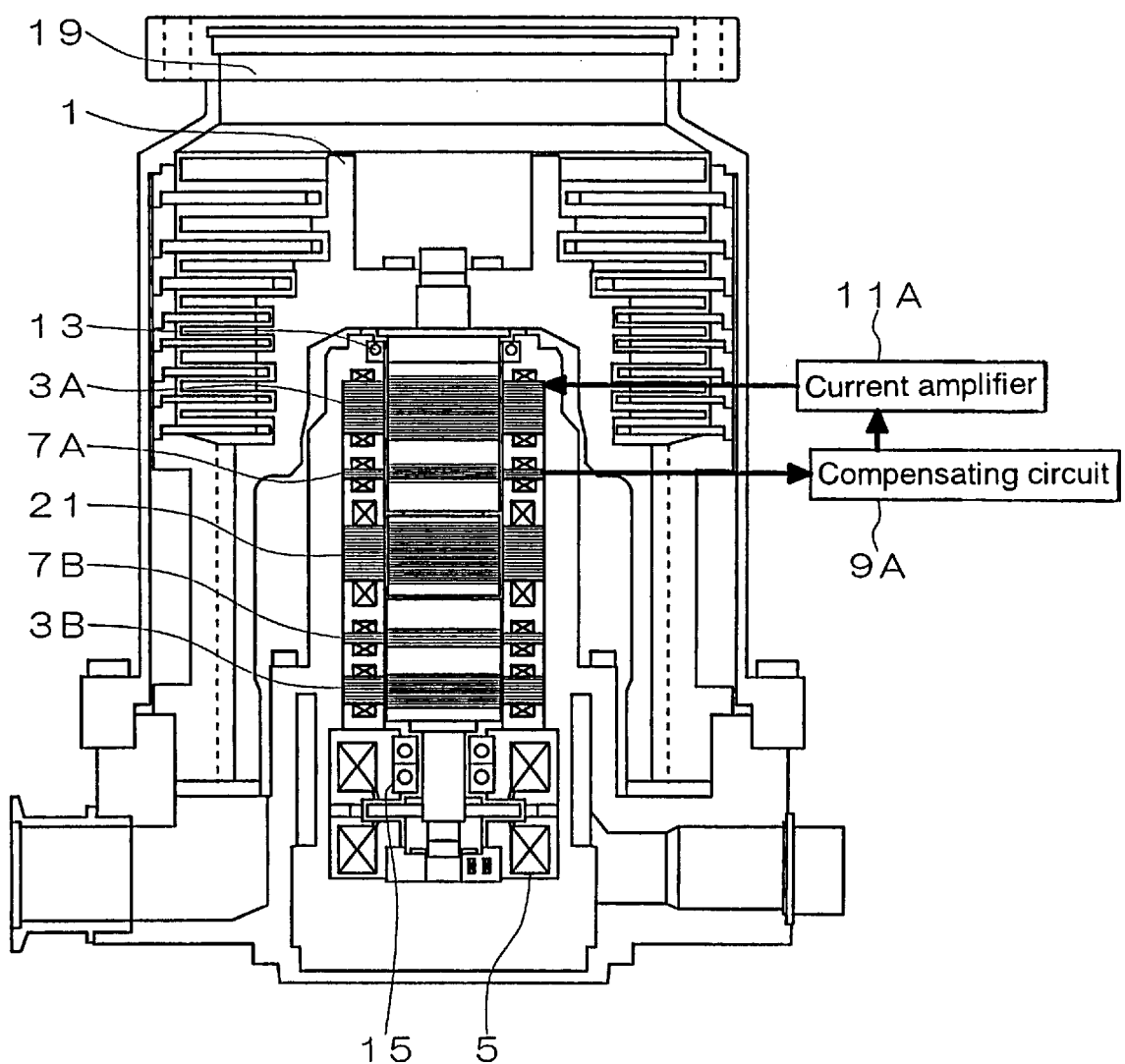
FIG. 1 is a structural diagram showing an embodiment of the present invention.

There is no current limiter 17, which is arranged in a conventional pump, in FIG. 1. Shown in FIG. 1 is a turbomolecular pump with a 5-axes-control type magnetic bearing applied thereto. It is understood that the present invention is not limited to the 5-axes-control type magnetic bearings, but may be applied to other spindle motors and the like adopting magnetic bearings.

Next, the operation of this embodiment of the present invention will be described with reference to a flowchart in FIG. 2.

Figure 2:
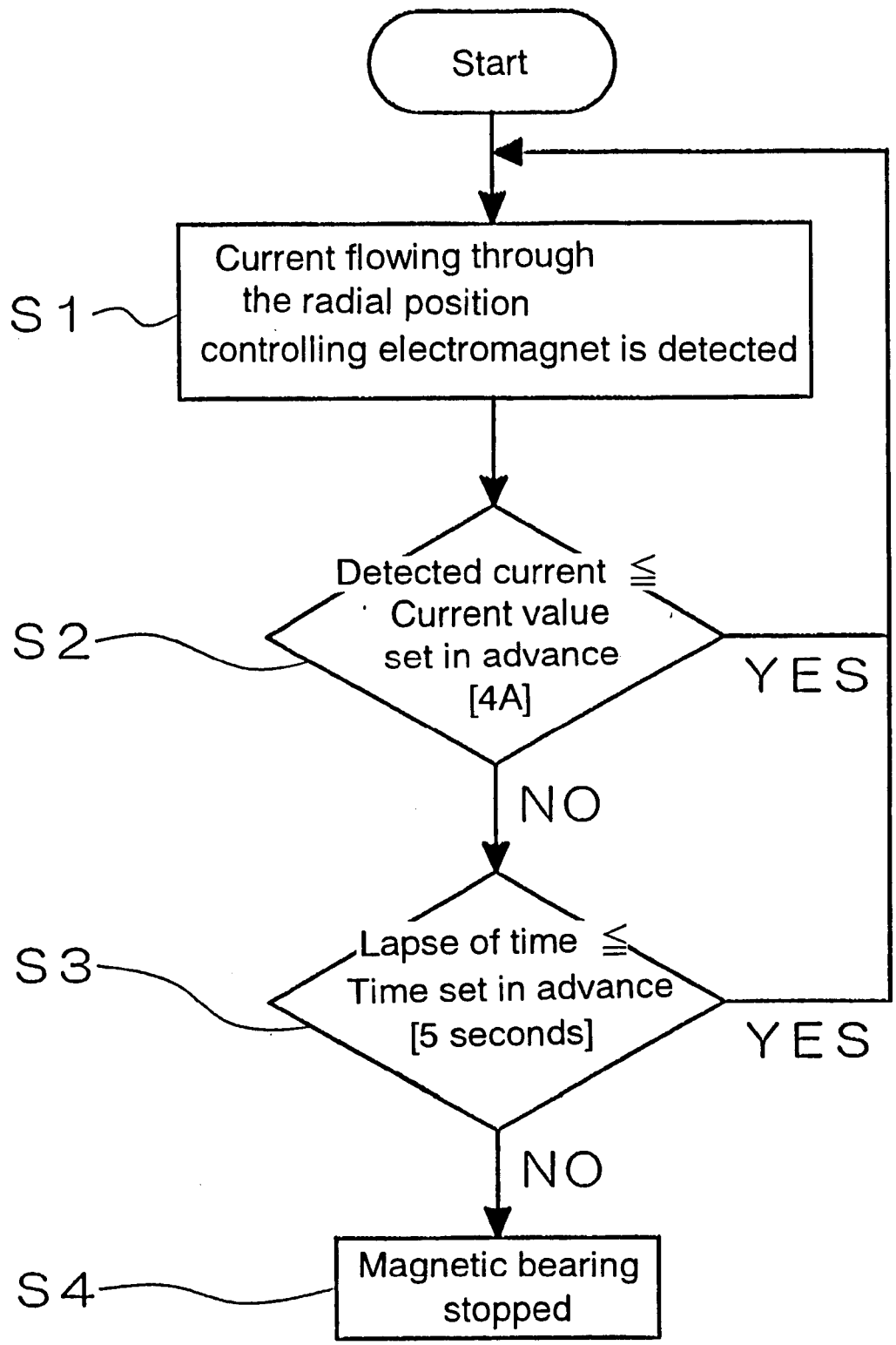
FIG. 2 is a flowchart.

The operation is illustrated in FIG. 2 taking as an example the control operation for a radial position controlling electromagnet 3A. Another radial position controlling electromagnet 3B and an axial position controlling electromagnet 5 are controlled through a similar mechanism and similar procedures.

First, current flowing through the radial position controlling electromagnet 3A is detected in Step 1 (abbreviated as S1 in the drawing: the same will apply thereinafter). In Step 2, it is determined or judged whether or not the detected current exceeds a preselected current value (i.e., a set current value that is set in advance.

For instance, when the limitation is put to the current limiter 17 as in a conventional case so that the current does not exceed 2 [A], the set current value is 4 [A]. The processing in Step 2 corresponds to the function of a current anomaly judging means. If the detected current is equal to or less than the set current value, the process is returned to Step 1 to again detect the current flowing through the radial position controlling electromagnet 3A.

If the judgment is made in Step 2 that the current exceeds the set current value, the process proceeds to Step 3. In Step 3, it is determined or judged whether or not the current flow exceeding the set current value lasts more than a preselected amount of time (i.e., a set time that is set in advance). The set time is 5 seconds, for example. The processing in Step 3 corresponds to the function of a time anomaly judging means.

If the judgement is made in Step 3 that the lapse of time from the start of the current exceed is longer than the set time, the process proceeds to Step 4, where the power supply to all current amplifiers including a current amplifier 11A and to a high frequency motor 21 is cut off.

Figure 4:
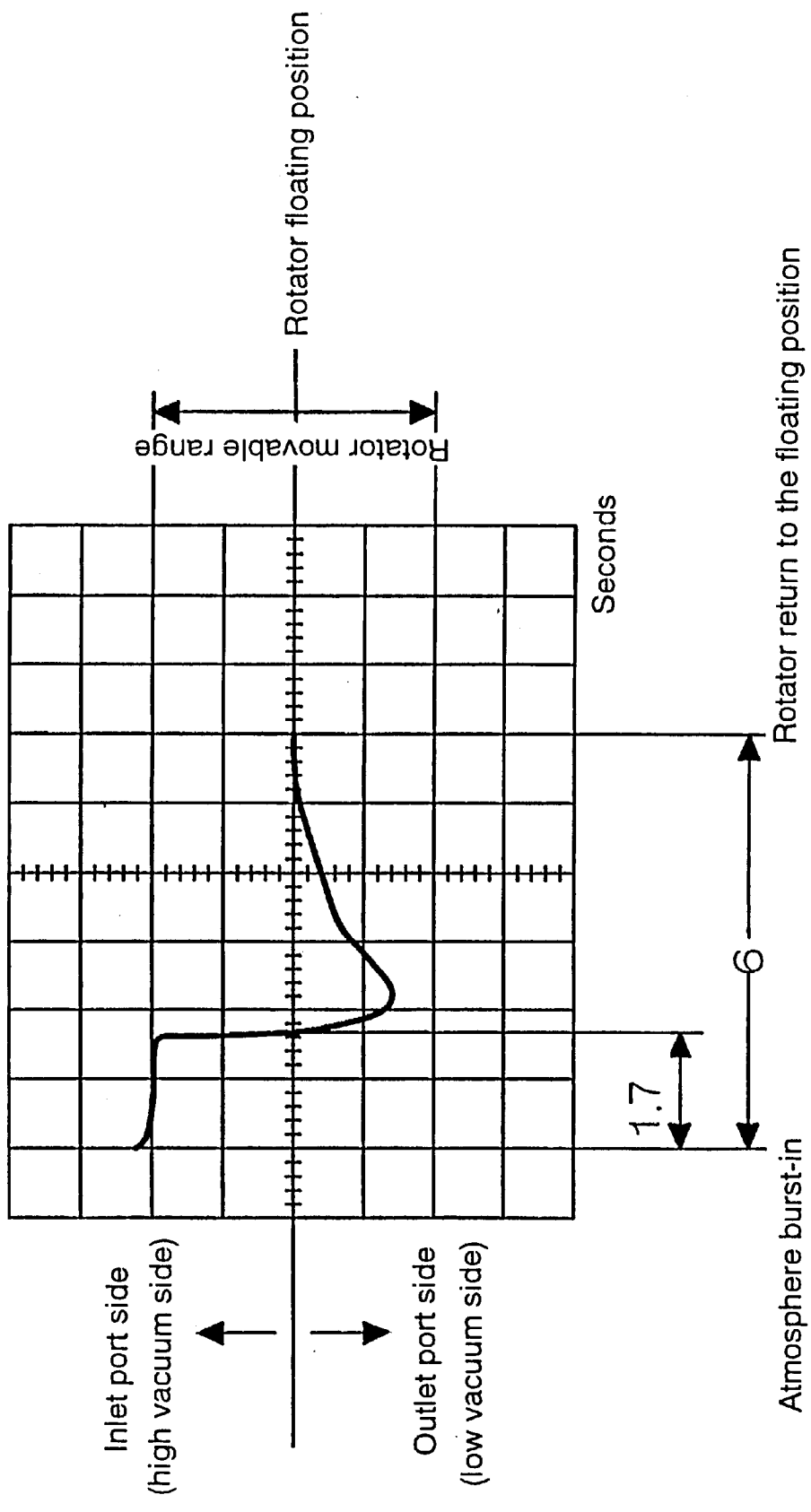

A set current value of 4 [A] and set time of 5 seconds are values which are successful in preventing overheat in the case of the conventional turbomolecular pump having the current limiter 17 mentioned above to limit the current to 2 [A]. By putting no limitation on the current while setting the set time to 5 seconds, the oscillation of rotor blades 1 upon the atmosphere burst-in as shown in FIG. 4 can readily be inhibited.

Thus the current is not limited so that, in most cases, the situation can be recovered before the turbomolecular pump has to be stopped in Step 4, inhibiting the oscillation and the like of the rotor blades 1. Therefore, the influence on the touch down bearings 13, 15 can also be reduced.

As described above, according to the present invention, the current supply to the controlling electromagnets is stopped when it is judged that the current flowing through the controlling electromagnets exceeds the set current value and that the current exceed lasts for over the set time, while putting no limitation to the current. Therefore, reaction speed in response to the excessive oscillation of the rotator and externally given shake is increased, resulting in early ending of the oscillation.

Moreover, the touch down bearings are subjected to less damage as compared to the conventional art.

What is claimed is:

1. A magnetic bearing protection device comprising:

a position sensor for detecting a position of a rotor;

at least one pair of controlling electromagnets for levitating the rotor and for controlling at least one of a radial position and an axial position of the rotor;

a compensating circuit for compensating the radial position or the axial position of the rotor in accordance with the position of the rotor detected by the position sensor;

current supplying means for supplying electric current to the controlling electromagnets through the compensating circuit;

controlling current detecting means for detecting a current flowing through the controlling electromagnets;

current anomaly judging means for judging whether or not the current detected by the controlling current detecting means exceeds a preselected current value;

time anomaly judging means for judging, when the current anomaly judging means judges that the current detected by the controlling current detecting means exceeds the preselected current value, whether or not the current exceed lasts more than a preselected amount of time; and stopping means for stopping the current supply from the current supplying means to the controlling electromagnets when the time anomaly judging means judges that the lapse of time from the start of the current exceed is greater than the preselected amount of time.

2. A magnetic bearing protection device comprising: at least one pair of electromagnets for levitating a rotor and for controlling one of a radial position and an axial position of the rotor; current supplying means for supplying a current to the electromagnets; detecting means for detecting a current flowing through the electromagnets; and stopping means for stopping the supply of current to the electromagnets by the current supplying means when a duration of time during which the current detected by the detecting means exceeds a preselected current value is greater than a preselected duration of time.

3. A magnetic bearing protection device according to claim 2; further comprising first determining means for determining whether the current detected by the detecting means exceeds the preselected current value.

4. A magnetic bearing protection device according to claim 3; further comprising second determining means for determining the duration of time during which the detected current exceeds the preselected current value.

5. A magnetic bearing protection device according to claim 2; further comprising determining means for determining the duration of time during which the detected current exceeds the preselected current value.

6. A method of protecting a magnetic bearing, comprising the steps of: providing a magnetic bearing having a rotor and at least one pair of electromagnets for levitating the rotor and for controlling one of a radial position and an axial position of the rotor; detecting a current flowing through the electromagnets; determining whether or not the detected current flowing through the electromagnets exceeds a preselected current value; determining, when the detected current flowing through the electromagnets exceeds the preselected current value, whether or not the current exceed lasts more than a preselected amount of time; and stopping a current supply to the electromagnets when a lapse of time from the start of the current exceed is determined to be greater than the preselected amount of time.

* * * * *